Patented Apr. 9, 1929.

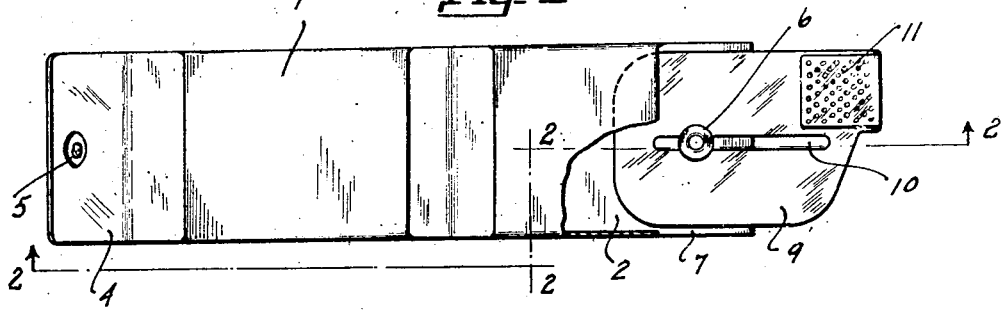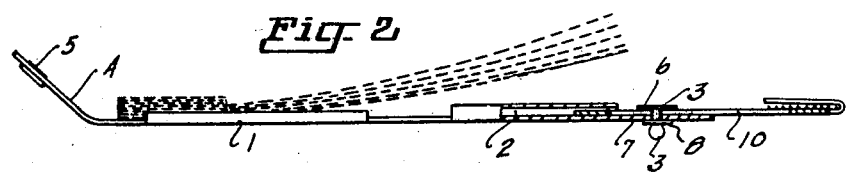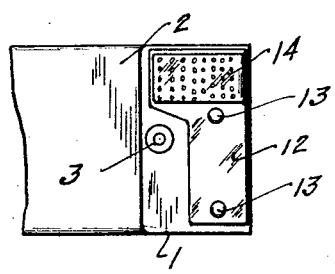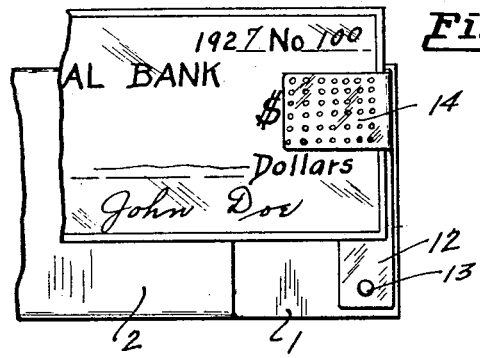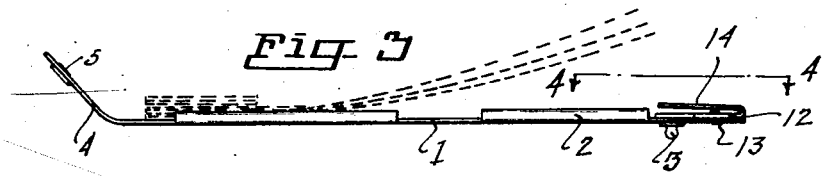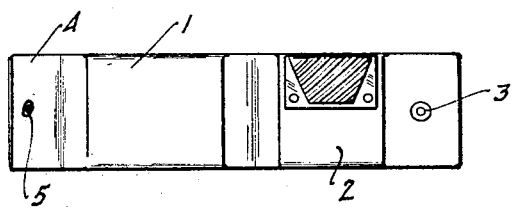

1,708,566

UNITED STATES PATENT OFFICE.

GEORGE W. COOKE, OF PORTLAND, OREGON, ASSIGNOR OF ONE-HALF TO HERBERT WALTON CARTER, JUNIOR, OF PORTLAND, OREGON.

CHECK PROTECTOR.

Application filed April 18, 1927. Serial No. 184,683.

A primary object of my invention consists in providing a check protector that is adapted to being maintained in a check book holder.

A further object of my invention consists in providing a check protector that may be directly secured and be in fixed relationship with the check book holder. The protector and the check book holders are supplied banks and other financial institutions.

A further object of my invention consists in providing a check protector associated with the check book holder so that when the same is in use it may be partially withdrawn from the pocket of the check book holder and after use be reinserted within the pocket of the check book holder, means being provided to prevent the removal of the check protector from its related association with the check book holder.

A still further object of my invention consists in providing a check protector of minimum cost and one that may be supplied to the user without any cost to him.

A further object of my invention consists in providing means whereby the writer of checks will always have at his disposal a check protector.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:—

Fig. 1 is a top plan view, partially in section of a check book holder from which the check book has been removed and illustrates the check protector partially withdrawn from the pocket of the holder.

Fig. 2 is a partial cross section of the side elevation of the mechanism illustrated in Fig. 1, with the check book illustrated within the holder.

Fig. 3 is a side elevation of the check book holder with the check book within the same and the check protector in a modified form secured to the check book holder.

Fig. 4 is an enlarged top plan view, taken on line 4—4 of Fig. 3, looking in the direction indicated.

Fig. 5 is a top plan view, of the check book holder, illustrating one of my protectors in place therein, of a modified form.

Fig. 6 is a detail showing a check in co-operating relationship with the check protector.

Like reference characters refer to like parts throughout the several views.

1 is the body of a check book holder of the folding type commonly in use, having a pocket 2, disposed in one end thereof into which the deposit book is to be inserted. A snap fastener 3, is associated with the pocket end 2 of the check book holder, into which the oppositely disposed end 4, of the check book holder is secured by the insertion of the male end of the snap fastener 3 into the female element 5. Disposed upon the inner end of the body portion of the snap fastener 3, is an annular head 6, in spaced relationship with the body 7, of the check book holder. A second collar 8 is also disposed on the body portion of the snap fastener, upon the oppositely disposed side of the body element 7. I place in slidable relationship with the body portion of the snap fastener 3, a check protecting element 9, having a slot 10 longitudinally disposed between its side walls and having the outer end of the same bent over to form a loop 11, serrations being formed on the inner side of the body portion 9 and loop portion 11 and in registerable relationship with each other to facilitate the serrating of the check, the serrations being formed over the amount in figures when the check has been placed thereunder. The check protector is preferably made of spring material, as of spring steel or spring brass, in order that the loop portion 9, may be maintained in spaced relationship with the body portion of the same to permit of the passage of the check to be protected therebetween. The inner end of the body portion of the check protector is adapted to passage within the pocket 2, of the check book holder so that after the same has been used it may be reinserted within the pocket by the slot 10 engaging the body portion 3, of the snap fastener. A modified form of my protector is illustrated in Fig. 4, wherein the body portion 12 of the check protector is directly secured to the inner side of the check book holder and is secured thereto by any suitable fastening means, as by rivets 13. The loop to form the check protector is shown at 14, and the check protecting portion is so positioned as to interfere as little as possible to the writing of the last check within the check book. A still further modification of my device is illustrated in Fig. 5, wherein the check protector may be placed within the body portion of the check book holder and between the ends thereof and being spaced at right angles to the writing position of the check so that it is not necessary to remove the check after the same has been written and place the same within the check protector.

Additional check books may be supplied to the check book holders, as is now done in common practice, but the check protector being directly associated with the check book holder, prevents its removal therefrom and insures a check protector being available at all times when the check book is in use or in possession of the holder thereof and being of simple and economical construction the same may be supplied to the customer of the bank with a minimum of cost to the bank and to the user.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows:

What I claim is:—

In a check book provided with a pocket, a snap fastener having its body portion extending through said book and projecting therefrom opposite the mouth of said pocket, and a collar surmounting such projecting portion; a check protector therefor comprising a plate capable of being inserted in said pocket, said plate carrying check protecting elements, and being provided with an elongated slot extending longitudinally thereof, the extended portion of the snap fastener penetrating said slot, said collar preventing the removal thereof, and the aforesaid slot permitting said plate to be inserted and withdrawn from said pocket substantially as described.

GEORGE W. COOKE.